April 5, 1932. H. W. PLEISTER ET AL 1,852,089
BOLT ANCHOR
Filed April 30, 1931 3 Sheets-Sheet 1
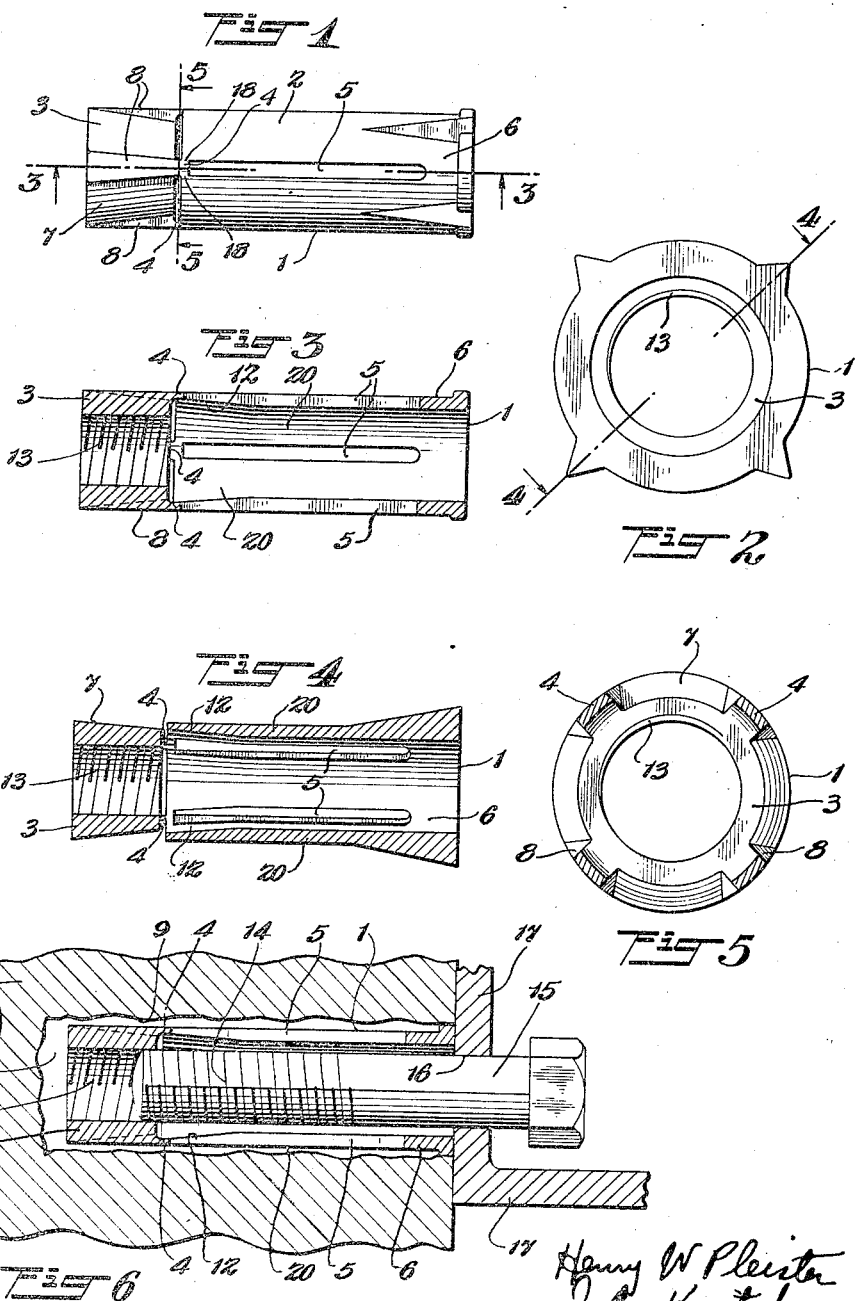

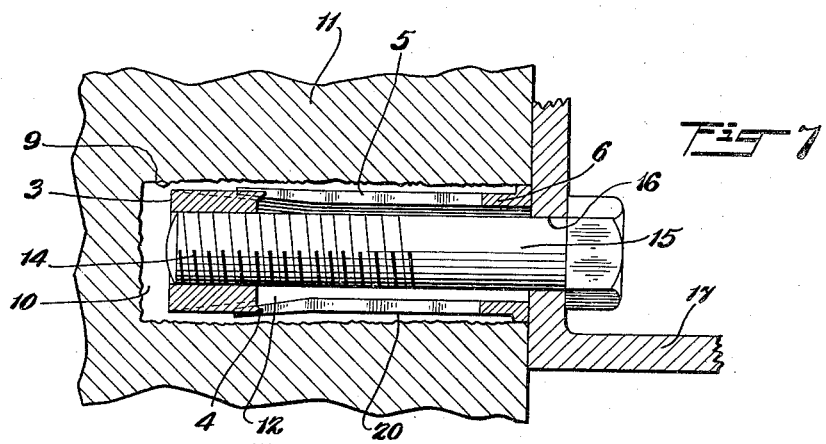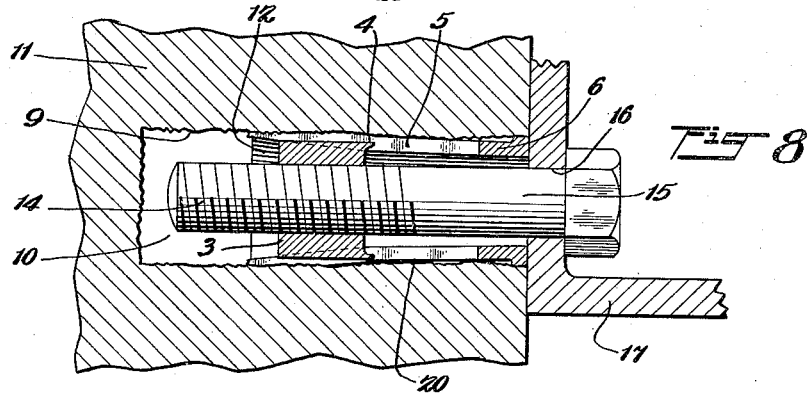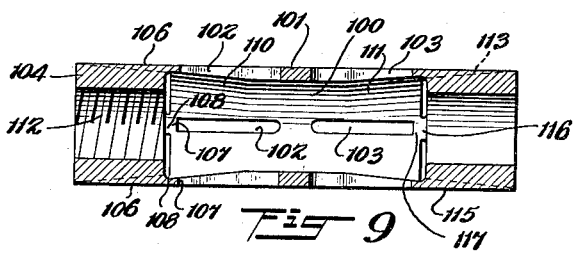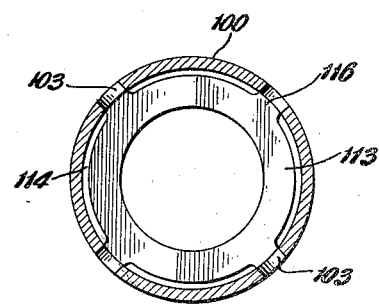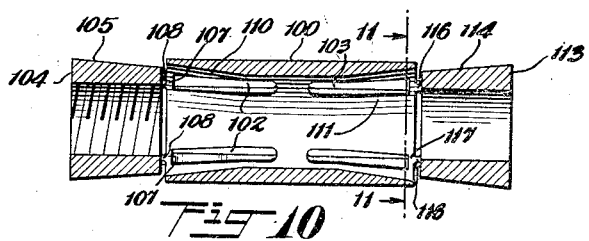

April 5, 1932.   H. W. PLEISTER ET AL   1,852,089
BOLT ANCHOR
Filed April 30, 1931   3 Sheets-Sheet 3
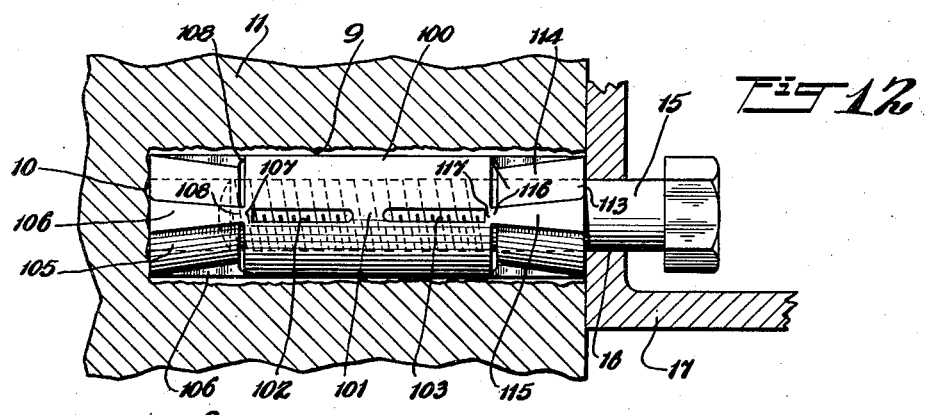
Fig. 12
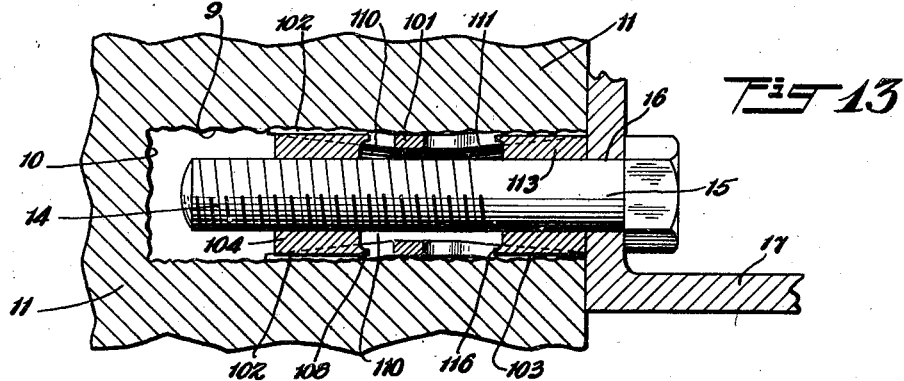
Fig. 13
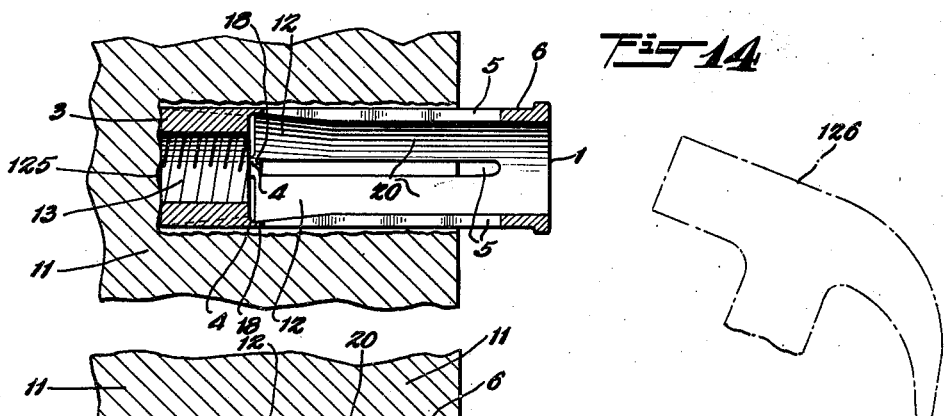
Fig. 14
Fig. 15
Henry W. Pleister
John Kritzky
INVENTORS
BY  Alanson Johnson
ATTORNEY Patented Apr. 5, 1932

1,852,089

UNITED STATES PATENT OFFICE

HENRY W. PLEISTER, OF WESTFIELD, AND JOHN KARITZKY, OF GARWOOD, NEW JERSEY, ASSIGNORS TO HENRY B. NEWHALL CORPORATION, OF GARWOOD, NEW JERSEY, A CORPORATION OF NEW JERSEY

BOLT ANCHOR

Application filed April 30, 1931. Serial No. 533,918.

Our invention relates to bolt anchors.

Our invention further relates to a bolt anchor including expanding means formed originally in one integral piece, with integral connecting members holding them together, said integral connected members being broken in situ.

Our invention further relates to an integral bolt anchor formed of an integral shield or cage and expanding means connected to said shield or cage by breakable means, said breakable means being of sufficient strength to withstand handling and transportation.

Our invention further relates to a machine type expansion in which the shield or cage and expanding means are all formed integral; the expanding means being broken from the shield or cage in situ, and then adapted to telescope and expand the shield or cage by the aid of the usual machine bolt.

Our invention more particularly relates to such a bolt anchor as described above, in which the rigid integral parts are so arranged that when the integral connecting members are broken in situ, there can be no relative rotary movement between the shield or cage and the expanding means, whether the expanding means be one or more laterally movable members.

Our invention further relates to such a bolt anchor in which the shield or cage is provided with one or more lateral slots forming tines, and one or more integral rigid expanding members provided with guiding, or, guiding and expanding, means extending into such slots, more or less, and breakable connections between the shield and the guiding means, or guiding and expanding means, so that there will be no danger of misalignment between the shield and the expanding member, or members, when broken in situ.

Our invention further relates to certain combinations, sub-combinations, articles of manufacture and details of construction, all of which will be more fully hereinafter described and pointed out in the claims.

In the figures we have shown different embodiments of our invention, the same reference numerals refer to similar parts of the several figures.

Fig. 1 is a plan view of one form of bolt anchor, made in accordance with our invention;

Fig. 2 is an end view looking to the left of Fig. 1;

Fig. 3 is a vertical section on line 3—3 of Fig. 1, looking in the direction of the arrows;

Fig. 4 is a longitudinal section on line 4—4 of Fig. 2;

Fig. 5 is a vertical section on line 5—5 of Fig. 1;

Fig. 6 is a vertical section of a machine type bolt anchor of Fig. 1, mounted in a hole, and about to be expanded by a machine bolt;

Fig. 7 is a vertical section, similar to Fig. 6, illustrating the action of the machine bolt breaking the connecting members;

Fig. 8 is a vertical section, similar to Fig. 7, illustrating the telescoping action and the full expansion of the expansion bolt;

Fig. 9 is a vertical section of a modification illustrating a double type machine expansion;

Fig. 10 is a horizontal section of the double type bolt anchor shown in Fig. 9;

Fig. 11 is a vertical section on line 11—11 of Fig. 10;

Fig. 12 is a vertical section of the double machine expansion of Fig. 9, about to be expanded by a machine bolt;

Fig. 13 is a vertical section similar to Fig. 12, showing the telescoping action and the bolt anchor expanded;

Fig. 14 is a vertical section of our bolt anchor mounted in a hole about to be expanded by a hammer;

Fig. 15 is a vertical section showing the bolt anchor expanded.

Our invention relates to simplifying and cheapening the cost of manufacturing bolt anchors. For purposes of illustration we have shown in our drawings a single and double type machine bolt expansion, though, of course, our invention is not to be limited to these particular forms of expansion bolts.

In the ordinary machine type expansion the shell or cage is formed of two or more parts held together usually by means of a split spring ring. In the single type machine expansion, a tapped cone nut has to be assembled and held within the shell or case by the same split spring ring. In the double machine type there is, in addition, an unthreaded cone sleeve held in the other end of the shell or cage by a second split spring ring. In transportation and in rough handling these assembled parts are apt to become disconnected, and, in some instances one or more of the parts might become lost, leading to the discard of the entire bolt anchor.

Among other advantages of our invention we avoid all the cost of assembling different parts, the cost of the split spring rings, or other securing means, any loss of parts in transportation or handling, and cheapen the cost of manufacture.

By our invention we cast, or otherwise form, a complete bolt anchor with the shield or cage and expanding member, or members, as one article, connected together with breakable connections adapted to be broken in situ.

As will more fully hereinafter appear our breakable connections, which are adapted to be broken in situ, connect splines with the shield. These splines are cast on the expanding member or members and are located initially, partially, in slots in the cage or shield, so that there can be no misalignment of the cage or shield when the breakable connections are broken.

We also preferably, though not necessarily, form the splines as wedges, so that in addition to performing the function of splines, they assist in forcing the sides of the slots apart, thereby increasing the grip or hold of the bolt anchor in a wall or other suitable support.

In Figures 1 to 8, inclusive, we have shown a single type machine expansion; in Figures 9 to 13, inclusive, a double type machine expansion, and in Figures 14 and 15 a single type machine expansion, expanded by a hammer, or similar tool, in a shallow hole. It is, of course, to be understood that a double type machine expansion, such as illustrated in Figures 9 to 13 inclusive, could also be preset, in the same manner in a shallow hole less than its length.

For purposes of illustration and description we will describe our bolt anchors as cast, though, of course, they may be otherwise formed.

In the single type machine expansion, 1 is the integral rigid bolt anchor formed of the expansible member 2 and the expanding member 3, rigidly held together by the integral breakable connecting members 18, 18. When cast, which is the preferred method of manufacture, these breakable connecting members 18, 18, are runners, and are not broken until the bolt anchor is expanded in situ.

The expansible member 2 is a cage or shield provided with one or more slots 5, 5, four being preferably employed, extending from the head 6.

The expanding member 3 is cast at the same time as the shield or cage 2 and is rigidly held to it by the breakable connecting members, or runners, 18, 18. The member 3 is provided with an exterior conical surface 7, and with one or more splines 8, 8, there preferably, though not necessarily, being the same number of splines as there are slots 5, 5 in the cage or shield. These splines 8, 8 are preferably, though not necessarily, formed as wedges so that after the breakable connections 18, 18 are broken in situ, the wedges are forced down the slots 5, 5 towards the head 6, and force the walls of the slots apart, thereby materially assisting in forming a powerful grip or hold between the shield 2 and the sides 9 of the hole 10 in the wall or other support 11.

This action assists the main expanding action of the cone nut 7 cooperating with the flaring opening 12 of the shield. After our bolt anchor is cast the member 3 is tapped to provide it with interior female threads 13 to cooperate with the male threads 14 of the machine bolt 15.

We initially locate out splines 8, 8 in, and preferably closing, the slots 5, 5, of the shield or cage 2. In this manner the splines are preferably located and "frozen" in their correct initial position, so that there can be no misalignment of the cone nut and the shield when the breakable connections 18, 18 are broken in situ. Nor can there be any relative rotation between the cone nut and the shield 2, because at all times the splines 8, 8 are in operative position, with their cooperating slots 5, 5.

In use a hole 10 is drilled or otherwise formed in the wall 11. The rigid integral bolt anchor, Figures 1 and 2, is then inserted in the hole 10. The machine bolt 15 is then passed through a hole 16 in the work to be supported 17, and is threaded into the rigid immovable cone nut 3, Figure 6. By screwing upon the head of the bolt 15 the breakable connections 18, 18 between the ends 4, 4 of the different splines 8, 8 and the shield or cage 2, are broken, Figure 7. By continuing to rotate the bolt 15 it will be seen that there can be no relative rotation between the cone nut 3 and the shield or cage 2 because each spline 8 is initially, but rigidly, located in its own cooperating slot 5. When the breakable connections, or runners, 18, 18 holding the ends 4, 4 of the splines 8, 8 to the shield 2 are broken, the cone nut cannot rotate relatively to the shield, but can move laterally towards the head 6. This brings the conical surface 7 of the nut into cooperation with the flaring surface 12 of the shield or cage 2. The ends of the slots 5, 5 being now open, where they had previously been closed by the ends 4, 4 of the splines 8, 8 and the breakable connections 18, 18, permits the cone nut 3 to radially spread the ends of the tines 20, 20, Fig. 8.

At the same time the side walls of the slots 5, 5 are forced apart by the splines 8, 8 which are preferably, though not necessarily, formed as wedges. This action, of course, materially assists the main grip or bond formed by the cone nut cooperating with the flaring surface 12 of the shield.

It is, also, to be noted, that when the bolt anchor is cast each breakable connection 18, 18 is a runner connecting each spline 8 with the shield at two points. If the shield is provided with four slots 5, 5, there will be eight runners or breakable connections, two for each spline and each slot. Among other advantages this facilitates the even flow of the metal in the mould because there are eight passages for the metal to follow between the shield and cone nut. By closing each of the slots 5, 5 with a spline and breakable connections between the splines and the shield a very light, strong and rigid construction is formed.

Our invention may also be employed with a double type machine expansion. We have shown one example of such a construction in Figures 9 to 13 inclusive.

In this form the cage or shield 100 is provided with a central ring or stop 101, and two sets of slots, 102, 102, and 103, 103.

Cast integral with the shield 100 is a cone nut 104 having a conical surface 105, in all respects similar to the single type machine bolt anchor previously described. This cone nut is provided with splines 106, 106, the very ends 107, 107 of the splines 106, 106 being located within the slots 102, 102, there being the usual two runners, or breakable connections, 108, 108 between the ends 107, 107 of each spline 106 and the shield 100; the ends of the splines and the breakable connections close each slot 102, 102.

The shield or cage 100 is provided with two flaring surfaces 110 and 111, respectively. The first flaring surface cooperates with the conical surface 105 of the cone nut 104, when the breakable connections are broken. The cone nut 104 is provided with interior screw threads 112, the same as in the other form.

At the other end of the shield or cage 100 an integral sleeve 113 is cast, the same as the cone nut 104, with the exception that this sleeve is not provided with screw threads. It has a conical exterior surface 114 adapted to cooperate with the flaring surface 111. It is also provided with splines 115, 115 the very ends of which, 116, 116, are cast within the slots 103, 103, one spline for each slot. Each of the splines of the sleeve 113 is connected by two breakable connections 117, 117, with the shield 100.

In use this double type machine expansion is placed in the hole 10 in the wall 11. A machine bolt 15 is then passed through the hole 16 in the work 17 and screwed into the rigid nut 105, passing freely through the unthreaded sleeve 113, Fig. 12. By then screwing up on the bolt 15 the breakable connections between the splines on the cone nut 104 and the unthreaded sleeve 113, will be broken.

There will be no misalignment, however, because the splines 106 on the cone nut and the splines 115 on the sleeve 113 have their ends cast within their respective cooperating slots 102 and 103 respectively. This insures that there will be no relative rotation between the cone nut 104 and the shield 100, or between the shield and the unthreaded sleeve 113.

The splines on both the cone nut and the sleeve 113 being preferably wedge shaped, the walls of the slots 102 and 103 will be forced apart, thereby materially adding to the main grip or bond formed by the cone nut 105 cooperating with the flaring surface 110 of the shield 100, and the cone sleeve 113 cooperating with the flaring surface 111 of the shield, Fig. 8.

The opening in the mold forming the stop 101, serves to assist the quick flow of the molten metal, which is still further assisted in flowing through the mold, by the two runners or breakable connections 108, 108 and 117, 117, between each spline 106 on the cone nut 104, and each spline on the unthreaded sleeve 113, respectively.

To save the expense of drilling a hole of full depth such as shown in Figures 7 and 8, we may drill a hole 125 of less depth than the length of the bolt anchor, so that when the bolt anchor is located, a portion of it will protrude from the hole, Fig. 14.

When this protruding portion is subjected to force, as to blows of a hammer, 126, the breakable connections will be broken and the cone nut forced into the shield as shown in Fig. 15. In this position the bolt anchor will be pre-set and pre-expanded without the aid of the bolt 15. Such a bolt may be later used to support the work, not shown in these figures; and, if necessary, the bond or grip of the bolt anchor may be increased by rotating a bolt 15, not shown in Fig. 15, drawing the cone nut still further into the shield. Of course the double type machine expansion shown in Figures 9 to 13, inclusive, can be expanded by a hammer, or a similar tool, in the same manner.

Our bolt anchors are for use in walls, floors, ceilings, or supports of masonry, concrete, brick, terra cotta, stone, or other material in which it is impossible to directly screw a screw, or drive a nail or spike.

While we have illustrated and described a machine bolt cooperating with the cone nut, it is of course, to be understood that our invention and our claims cover a bolt having lag screw threads, or any other form of threads, and that the cone nut will be provided with cooperating female threads.

Having thus described this invention in connection with illustrative embodiments thereof, to the details of which we do not desire to be limited, what is claimed as new and what is desired to secure by Letters Patent is set forth in the appended claims.

What we claim is:—

1. A new article of manufacture comprising a bolt anchor having an integral shield provided with cooperating interlocking surfaces, an integral expanding member provided with interlocking surfaces, and integral breakable means holding said interlocking surfaces on the shield and expanding member in line with each other and also holding the integral shield and integral expanding member rigidly together in their initial position and adapted to permit the interlocking surfaces on the integral shield and integral expanding member to positively cooperate with each other to prevent misalignment of said members.

2. In a bolt anchor the combination of an expansible shield provided with tines and slots, an integral expanding member rigidly held to the shield by splines closing the slots, and breakable connections between the splines and the shield.

3. In a bolt anchor the combination of an expansible shield provided with tines and slots, an integral expanding member rigidly held to the shield by splines extending into the slots, more or less, and breakable connections between the splines and the shield.

4. In a bolt anchor the combination of an expansible shield provided with tines and slots, an integral expanding member rigidly held to the shield by wedges closing the slots, and breakable connections between the wedges and the shield.

5. In a bolt anchor the combination of an expansible shield provided with tines and slots, an integral expanding member rigidly held to the shield by wedges extending into the slots, more or less, and breakable connections between the wedges and the shield.

6. The combination in a double type machine expansion of an integral shield having cooperating interlocking surfaces for a cone nut and a cone sleeve, an integral expanding cone nut provided with interlocking surfaces to cooperate with those carried by the shield, integral breakable connections holding the said co-operating interlocking surfaces on the cone nut in line with the co-operating interlocking surfaces on the shield and also holding the cone nut and shield rigidly together and adapted to permit the interlocking surfaces on the shield and cone nut to positively cooperate with each other to prevent misalignment, a cone sleeve provided with interlocking surfaces to cooperate with those carried by the shield, and integral breakable connections holding the said co-operating interlocking surfaces on the cone sleeve in line with the co-operating interlocking surfaces on the shield and also holding the cone sleeve and shield rigidly together to permit the interlocking surfaces on the shield and cone sleeve to positively cooperate with each other and prevent misalignment between the sleeve and shield.

7. The combination in a double type machine expansion of an integral shield having cooperating slots at each end of the shield, an integral cone nut at one end of the shield and an integral cone sleeve at the other end of the shield, splines on the cone nut and cone sleeve closing said slots in the shield, and breakable connections between said splines and said shield.

8. The combination in a double type machine expansion of an integral shield having cooperating slots at each end of the shield, an integral cone nut at one end of the shield and an integral cone sleeve at the other end of the shield, splines on the cone nut and cone sleeve extending into said slots in the shield, and breakable connections between said splines and said shield.

9. The combination in a double type machine expansion of an integral shield having cooperating slots at each end of the shield, an integral cone nut at one end of the shield and an integral cone sleeve at the other end of the shield, wedges on the cone nut and cone sleeve closing said slots in the shield, and breakable connections between said wedges and said shield.

10. A new article of manufacture comprising a cast bolt anchor having an integral shield provided with one or more slots and tines, an integral expanding member provided with one or more integral splines, and breakable runners connecting the splines with the integral shield, the entire bolt anchor being a single integral casting.

11. A new article of manufacture comprising a cast bolt anchor having an integral shield provided with one or more slots and tines, an integral expanding member provided with one or more integral splines, the end of one spline being rigidly held within a slot in the shield, and breakable runners connecting the spline with each side of the slot, the entire bolt anchor being a single integral casting.

12. A new article of manufacture comprising a cast bolt anchor having an integral shield provided with one or more slots and tines, an integral expanding member provided with one or more integral wedges, and breakable runners connecting the wedges with the integral shield, the entire bolt anchor being a single integral casting.

HENRY W. PLEISTER.
JOHN KARITZKY.